United States Patent [19]

Vinciguerra

[11] Patent Number: 5,228,788
[45] Date of Patent: Jul. 20, 1993

[54] COMPACT ROLLER BEARING

[75] Inventor: Costantino Vinciguerra, Florence, Italy

[73] Assignee: Nuovopignone Industrie Meccaniche e Fonderia SpA, Florence, Italy

[21] Appl. No.: 912,038

[22] Filed: Jul. 9, 1992

Related U.S. Application Data

[63] Continuation of Ser. No. 638,084, Jan. 7, 1991, abandoned.

[30] Foreign Application Priority Data

Jan. 19, 1990 [IT] Italy ................ 19109 A/90

[51] Int. Cl.⁵ ............................ F16C 43/04
[52] U.S. Cl. .................. 384/561; 384/584; 29/898.063; 29/447
[58] Field of Search ............ 29/898.06, 898.062, 29/898.063, 898.066, 447, 724, 800; 384/559, 561, 584, 537

[56] References Cited

U.S. PATENT DOCUMENTS

| | | | |
|---|---|---|---|
| 1,447,844 | 3/1923 | Hagenlocher | 384/559 |
| 1,738,984 | 12/1929 | Brown | 384/559 |
| 2,259,325 | 10/1941 | Robinson | 29/404 |
| 4,270,815 | 6/1981 | Olschewski et al. | 384/561 |
| 4,997,297 | 3/1991 | Blount | 384/561 X |
| 5,000,588 | 3/1991 | Prinz | 384/561 |
| 5,001,831 | 3/1991 | Vinciguerra et al. | 29/898.062 |

FOREIGN PATENT DOCUMENTS 2718212 11/1978 Fed. Rep. of Germany ...... 384/561
3426185 3/1991 Fed. Rep. of Germany .

Primary Examiner—Mark Rosenbaum
Assistant Examiner—S. Thomas Hughes
Attorney, Agent, or Firm—Morgan & Finnegan

[57] ABSTRACT

A fully or partly filled roller bearing of very small axial dimension and high loading capacity, in which the rollers are retained between two cylindrical guide and rolling tracks of an inner race and outer race of the bearing by at least one small-thickness lateral shoulder-forming ring with its inner edge of frusto-conical shape. The ring, after being expanded preferably by heating, is inserted into a corresponding annular housing groove provided in an edge of the bearing inner race. The groove has a wall of frusto-conical shape flared towards the interior of the race and a mouth of diameter slightly greater than the minimum diameter of said lateral shoulder-forming ring.

5 Claims, 3 Drawing Sheets

COMPACT ROLLER BEARING

This is a continuation of co-pending application Ser. No. 07/638,084, filed on Jan. 7, 1991, now abandoned.

This invention relates to a new method which in a very simple, economical and efficient manner enables a preferably fully filled roller bearing of high load-carrying capacity to be formed. The bearing is of very small axial dimension, of the order of 6 mm, and thus particularly suitable for modern rotary dobbies operating at high speed. It is extremely strong and can be constructed with components which have undergone hardening heat-treatment and are thus preferably indeformable, and in addition can be easily removed and/or replaced.

The invention also relates to the fully or partly filled roller bearing formed in accordance with said method or partial method.

BACKGROUND OF THE INVENTION

From the current state of the art, and more specifically from our previous U.S. patent application Ser. No. 375,461 filed on Jul. 5, 1989, now U.S. Pat. No. 5,001,831, a method is already known for forming a fully filled roller bearing of high load-carrying capacity and very small axial size, as required particularly in modern rotary dobbies for forming the pivotal connection between the cams of the driving crank arms and the main shaft and between said cams and the relative arms.

According to this known method, the rollers are held in position, between the cylindrical guide and rolling tracks of the outer race and of the inner race of the bearing respectively, by two opposing lateral shoulder-forming elastic rings which are snap-inserted into corresponding inwardly flared annular grooves formed in the opposing ends of the inner edge of said outer race of the bearing, and are locked in position by two opposing inclined annular appendices of substantially frusto-conical shape provided on said ends of said outer race, and which by means of two suitable opposing dies are axially pressed over an annular tooth projecting outwards from said elastic shoulder-forming rings.

This known method has however a series of drawbacks, the most serious of which is the need to plastically press the elements (the annular appendices), which besides being a possible cause of deformation of the guide and rolling tracks with a consequently deleterious effect on the proper sliding of the rollers, does not enable the bearing to be constructed of materials which have undergone hardening heat-treatment, and which would be unable to undergo said plastic deformation.

A further drawback derives from the fact that said shoulder-forming rings are never totally rigid with the bearing race and therefore have a limited strength, which limits the axial load carrying capacity of the bearing.

Further drawbacks arise from the material impossibility of removing the bearing because of the plastic deformation produced by said pressing, the need to provide suitable pressing dies and the need to always use two shoulder-forming rings, one on each side of the outer bearing race, to allow the most uniform pressing possible, and which can be done only with two equal and opposite dies.

SUMMARY OF THE INVENTION

The object of the present invention is to provide a method for forming a preferably fully filled roller bearing of very small axial dimension and high loading capacity which does not require any plastic pressing and which therefore no longer requires pressing dies, is more economical, is very strong and very resistant to axial loads, can be removed easily if required, and requires the use of only one shoulder-forming lateral ring. This is attained substantially in that the rollers are held in position, between the cylindrical guide and rolling tracks of the inner race and of the outer race of the bearing respectively, by at least one small-thickness lateral shoulder-forming ring which, after being expanded for example by heating, is inserted into an annular housing groove of slightly larger diameter than the ring itself, said groove being formed by mechanical machining in one edge of the cylindrical guide and rolling track of the bearing inner race.

In this manner, on cooling with consequent shrinkage, the shoulder-forming ring tightens against the wall of the annular housing groove with a high locking force which in practice rigidly connects it to the bearing inner race, so making it extremely strong and also resistance to high axial loads.

Again, the absence of pressing operations and hence of dies not only allows the use of a single shoulder-forming ring and of materials hardened by heat-treatment, but also allows easy removal of the bearing as neither the inner race nor the outer race has undergone alteration of any kind.

To ensure more effective tightening of the lateral shoulder-forming ring against the wall of the annular housing groove without any possibility of withdrawl, said wall of the annular groove of the bearing inner race is made of inwardly flared frusto-conical shape with an inclination preferably greater than the angle of friction, so that not only can the lateral shoulder-forming ring not withdraw from the groove after cooling, but even during the cooling itself the ring is obliged to automatically position itself by sliding along the inclined wall of said annular housing groove until it presses against the inner flat base of said groove. The term "angle of friction of rest" (or "angle of repose") is defined, for example, in *Mechanical Engineers' Handbook*, L. S. Marks, McGraw-Hill Book Company, Inc., New York, 1951, pp. 217-219. As there described, the angle of friction of rest is the angle included between the force that is normal, or perpendicular to the two surfaces in contact and the resultant force, which latter force is equal in magnitude and opposite in direction to the force that is applied to the two bodies in contact. The tangent of the angle of friction of rest, moreover, is equal to the coefficient of friction of rest, or the coefficient of static friction.

It is also apparent that in addition to having a small thickness and an inner diameter slightly less than that of the mouth of said annular housing groove, said shoulder-forming ring must also have its inner edge of frusto-conical shape corresponding to the frusto-conical wall of said annular groove. On its outer face a bevel is machined extending from the outer periphery of the ring to about half way along its width.

The purpose of this ring bevel is to give the ring the tendency to roll inwards, i.e. towards the rollers, so as to ensure that no part of the ring can ever project beyond the small thickness of the bearing, this tendency being opposed by the resting of the ring against said inner flat base of the groove and by the cooperation between the inwardly flared frusto-conical walls of the ring and groove.

DETAILED DESCRIPTION OF THE INVENTION

Thus, the method for forming a preferably fully filled roller bearing of very small axial dimension and high loading capacity comprising an inner race and an outer race provided with facing cylindrical guide and rolling tracks for said rollers is characterised according to the present invention by comprising the following stages: forming in at least one of the edges of said cylindrical guide and rolling track of the bearing inner race an annular housing groove with a frusto-conical wall flared towards the interior of the race and with its inclination preferably greater than the angle of friction, and with a flat base perpendicular to said track; forming at least one small-thickness lateral shoulder-forming ring with its inner edge of frusto-conical shape corresponding to that of said frusto-conical part of the annular groove and with its minimum inner diameter slightly less than that of the mouth of said annular housing groove; inserting the rollers between said facing cylindrical tracks of said bearing inner and outer races using suitable means; expanding said lateral shoulder-forming ring or rings preferably by heating and inserting it or them into the respective annular housing groove or grooves; then allowing said lateral shoulder-forming ring or rings to cool and thus shrink.

According to a further characteristic of the present invention, the preferably fully filled roller bearing of very small axial dimension and high loading capacity formed in accordance with the method of the present invention, said bearing comprising an inner race and an outer race provided with facing cylindrical guide and rolling tracks for said rollers, in characterised in that in at least one of the edges of the cylindrical guide and rolling track for said rollers in the bearing inner race there is provided an annular housing groove with a frusto-conical wall flared towards the interior of the race and with a flat base perpendicular to said track, to cooperate with a lateral shoulder-forming ring for said shoulders which has a small thickness and an inner diameter slightly less than that of the mouth of said annular housing groove into which said ring is inserted after being expanded for example by heating, said lateral shoulder-forming ring having its inner edge of a frusto-conical shape corresponding to that of said frusto-conical wall of said annular groove, against which it is tightened by shrinkage consequent on cooling.

A further characteristic of the present invention is that said flaring of the frusto-conical wall of said annular housing groove and of the inner frusto-conical edge of said lateral shoulder-forming ring has an inclination exceeding the angle of friction. Finally, a further characteristic of the present invention is that on the outer face of said lateral shoulder-forming ring for said rollers there is provided a bevel which extends from the outer periphery to about half-way along the width of the ring. The invention is described hereinafter with reference to the accompanying drawings which illustrate preferred embodiments thereof by way of non-limiting example in that technical and constructional modifications can be made thereto without leaving the scope of the present invention.

It is however apparent that even though the accompanying drawings relate to the specific application of roller bearings in rotary dobbies, the invention is not limited to said field and can be extended to all fields in which a high load-carrying capacity bearing of very small axial dimension is required, as can be required in particular in reciprocating compressors and motors.

DETAILED DESCRIPTION OF THE DRAWINGS

Figure 2:
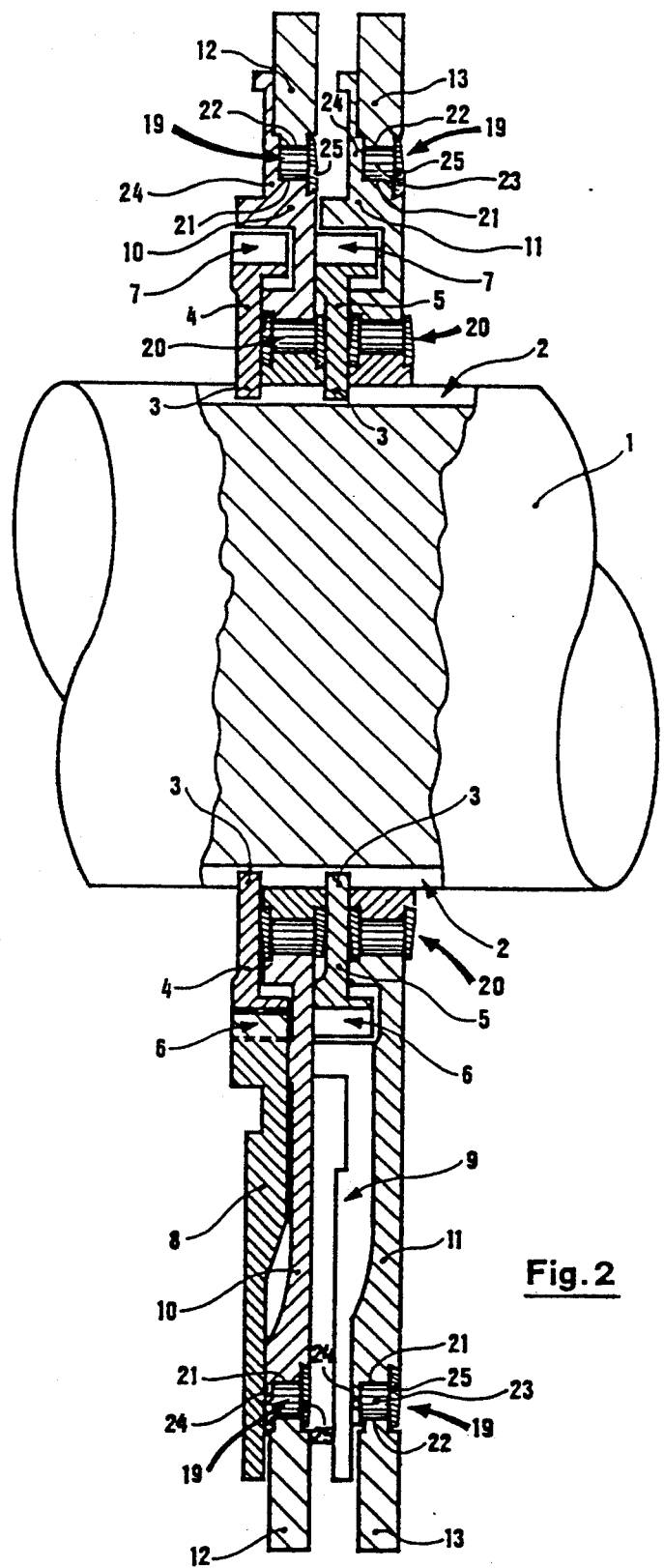
FIG. 2 is a cross-section on the line AA of FIG. 1 to an enlarged scale.

In the figures the reference numeral 1 indicates the main rotating shaft of a rotary dobby, comprising slots 2 into which there are inserted corresponding teeth 3 of two discs 4 and 5, each of which comprises two recesses 6 and 7 into which a key 8 can be inserted (only one is shown in FIG. 2, the other being removed to show the relative slide guide 9) in order to make said discs 4 and 5 and consequently said rotating shaft 1 rigid with the cams 10 or 11 of the dobby driving crank arms 12 or 13 respectively, the small ends of which are pivoted via a pin 14 between the two cheeks 15, 16 and 15', 16' of the dobby main levers 17 or 18. Said cams 10 and 11 are provided on their inner and outer periphery with two roller bearings 19 and 20 formed in accordance with the invention.

Figure 1:
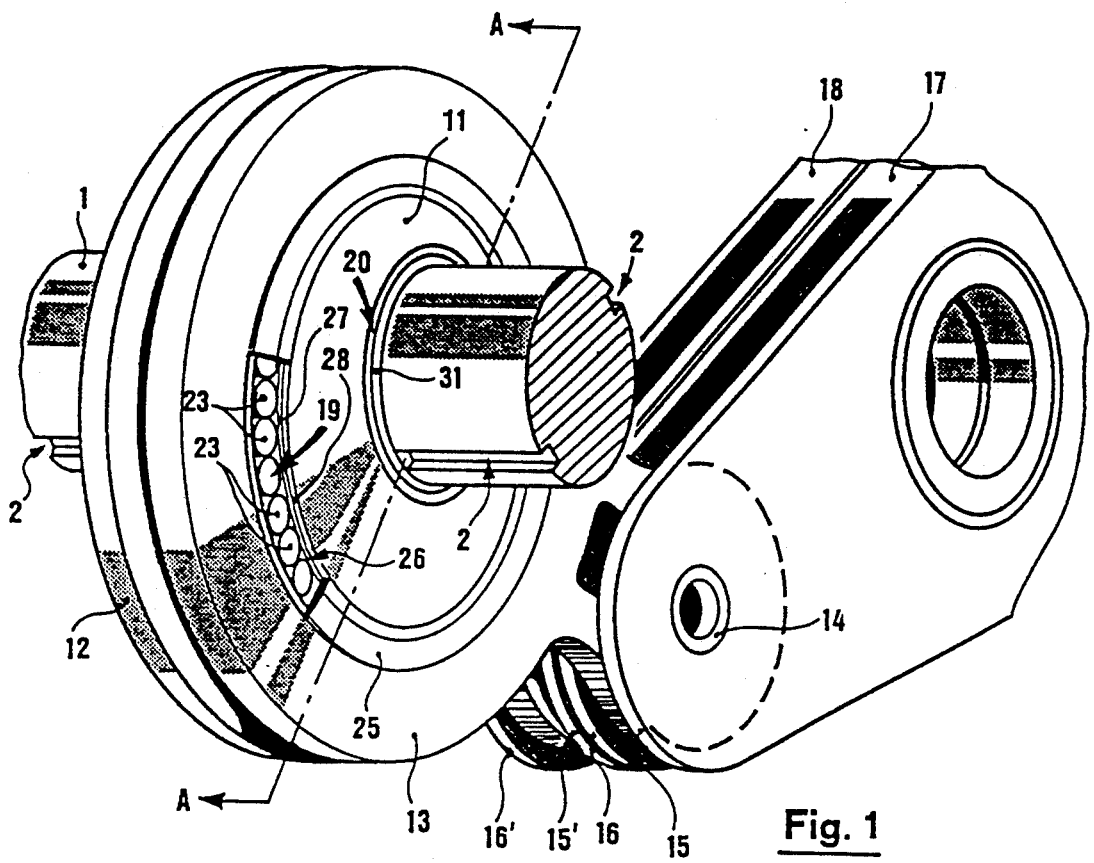
FIG. 1 is a partial perspective view of two cam-operated crank arms and two main levers of a rotary dobby using roller bearings formed in accordance with the present invention.
Figure 3:
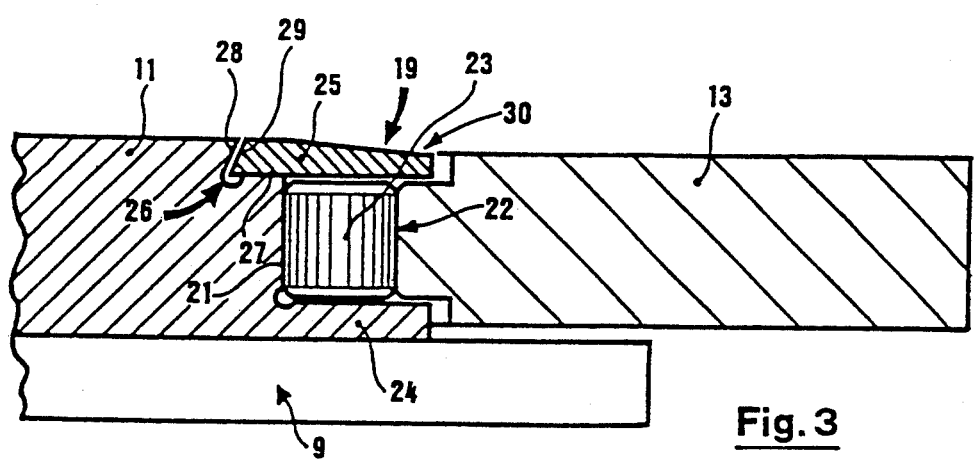
FIG. 3 is a partial cross-section to a very enlarged scale showing one embodiment of a roller bearing according to the invention situated between the cam and the crank arm.

The large-diameter roller bearing 19 has as its inner race the cam 11 (see specifically FIG. 3) and as its outer race the big end of the driving crank arm 13. Said bearing inner and outer races 11 and 13 are provided with facing cylindrical tracks 21 and 22 for the guiding and rolling of the rollers 23. Said rollers 23 are held axially in position respectively by a shoulder projection 24 provided on the inner race 11 and, on the other side, by a small-thickness lateral shoulder-forming ring 25 which is inserted into an annular housing groove 26 provided in the edge of the cylindrical track 21 of the bearing inner race 11.

Figure 5:
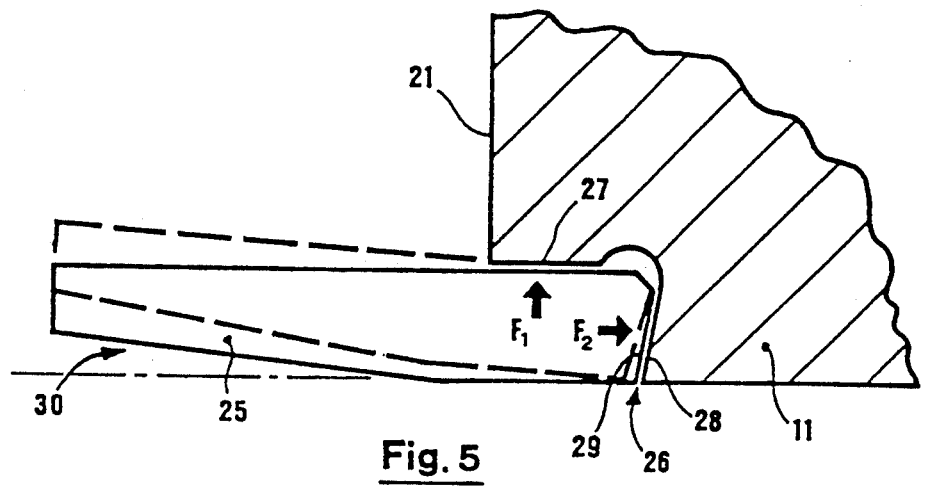
FIG. 5 is a partial cross-section through the roller bearing of the invention showing the lateral shoulder-forming ring formed in accordance with the invention, inserted into the respective annular housing groove.

Said annular groove 26 has a flat base 27 perpendicular to the track 21 and a frusto-conical circumferential wall 28 flared towards the interior of the race 11 and with its inclination preferably exceeding the angle of friction. Said shoulder-forming ring 25 itself has an inner edge 29 (see specifically FIG. 5) of frusto-conical shape corresponding to the shape 28 of said annular groove 26 but with its inner diameter slightly less than the corresponding diameter of the circumferential wall 28 of said groove 26 so that to be inserted into the groove it has firstly to be expanded, for example by heating, with the result that on cooling it becomes forced against said frusto-conical wall to thus become rigidly fixed to the bearing inner race 11. Said ring 25 comprises a bevel 30 (see specifically FIG. 5) extending from the outer periphery of the ring to about half-way along its width, said bevel creating a dissymmetry which tends to cause the ring 25 to roll towards the rollers 23 into position shown by dashed lines in FIG. 5, this tendency being opposed by the fact of the ring resting against the flat base 27 of the groove. In this manner two forces $F_1$ and $F_2$ are created (see FIG. 5) which rigidly lock the shoulder-forming ring 25 both in the radial direction against the frusto-conical wall 28 and in the axial direction against the flat base 27.

Figure 4:
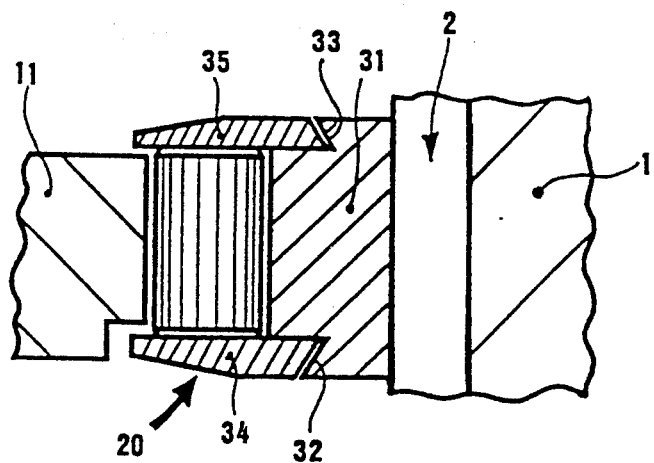
FIG. 4 is a partial cross-section to a very enlarged scale showing a further embodiment of a roller bearing according to the invention applied between the rotary shaft and the cam.

In contrast, the small-diameter roller bearing 20 (see specifically FIG. 4) has the cam 11 as its outer race whereas its inner race consists of a ring 31 keyed onto the rotating shaft 1 and comprising two opposing annular grooves 32 and 33 of frusto-conical wall and flat base and substantially identical to the grooves 26, they housing by a shrinkage fit two opposing lateral shoulder-forming rings 34 and 35 substantially identical to the described rings 25.

Figure 6:
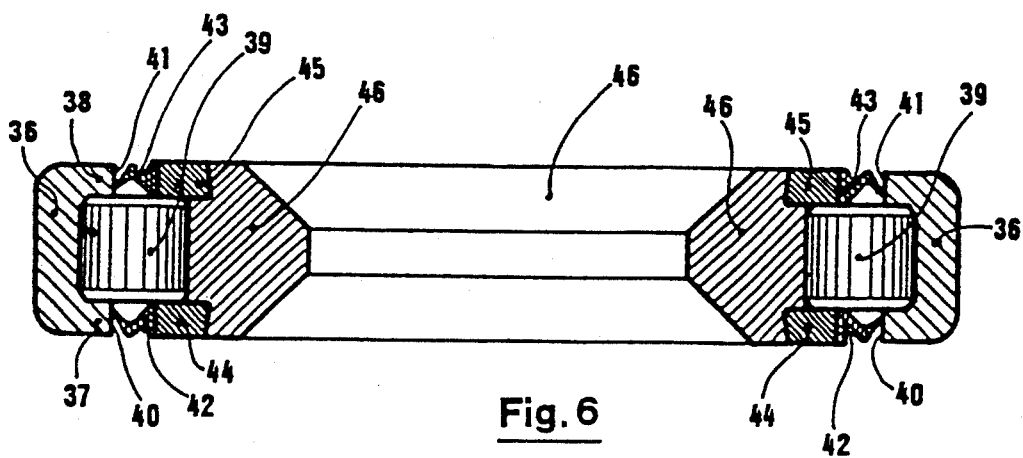
FIG. 6 is a cross-section through a modified embodiment of a roller bearing of the invention which allows sealed lubrication of the bearing.

Finally, FIG. 6 shows a modified roller bearing according to the invention which is particularly suitable for use in the joints of the operating levers for the loom heddle frames where the presence of a large quantity of dust makes it convenient to use pre-lubricated roller bearings with a hermetic rotating seal for the lubricating grease in the outward direction.

Said roller bearing consists substantially of an outer race 36 comprising two lateral shoulder appendices 37 and 38 for the rollers 39, terminating in two cylindrical seal surfaces 40 and 41 in sliding contact with two annular elastic retaining seals 42 and 43 made rigid with two opposing lateral shoulder-forming rings 44 and 45 similar to the described rings 25. The annular rings 44 and 45 are housed in corresponding annular grooves similar to the described grooves 26, in the bearing inner race 46.

I claim:

1. A fully or partly filled roller bearing of very small axial dimension and high loading capacity, said bearing comprising a plurality of rollers bound by an inner race and an outer race each race being provided with a respective cylindrical guide and rolling tracks for the rollers, wherein in one edge of the cylindrical guide and rolling track for said rollers in the bearing inner race there is provided an annular housing groove with a frusto-conical wall flared towards an interior of the inner race to establish groove diameters that progressively decrease toward said race interior and forming a flat base perpendicular to said inner race track, to cooperate with a lateral shoulder-forming continuous ring for said rollers which has a small thickness and an inner diameter slightly less than that of a mouth of said annular housing groove into which said ring is inserted after being expanded, said lateral shoulder-forming ring being flush with said groove housing mouth, said ring also having an inner edge of frusto-conical shape underlaying that of said frusto-conical part of said annular groove to retain said continuous ring within said annular housing groove mouth, against which the ring is tightened by shrinkage consequent on cooling, and in another edge of the bearing inner race there is provided a shoulder projection to hold said rollers axially in position.

2. A roller bearing as claimed in claim 1 wherein said frusto-conical wall of said annular housing groove and said inner frusto-conical edge of said lateral shoulder-forming ring have an inclination exceeding an angle of friction of rest for the roller bearing materials.

3. A roller bearing as claimed in claims 1 or 2, wherein on an outer face of said lateral shoulder-forming ring for said rollers there is provided a bevel which extends from an outer periphery to about half-way along a width of the ring.

4. A roller bearing as claimed in claim 1, wherein said ring is expanded by heating in order for said ring to be inserted within said annular housing groove mouth and to be retained within said housing groove mouth through shrinkage on cooling.

5. A roller bearing according to claim 1 further comprising an annular elastic retaining seal interposed between said inner race and said outer race in sliding contact therewith and overlaying at least a portion of said rollers.

* * * * *

UNITED STATES PATENT AND TRADEMARK OFFICE
CERTIFICATE OF CORRECTION

PATENT NO.   :   5,228,788
DATED        :   July 20, 1993
INVENTOR(S)  :   Costantino Vinciguerra It is certified that error appers in the above-identified patent and that said Letters Patent is hereby corrected as shown below:

Col. 6, line 3, delete "tracks" and substitute -- track --;

Col. 6, line 16, delete "groove"; and

Col. 6, same line, insert -- groove -- before "mouth."

Signed and Sealed this

Twenty-ninth Day of March, 1994

Attest:

BRUCE LEHMAN

*Attesting Officer*     *Commissioner of Patents and Trademarks*